United States Patent
Park

(10) Patent No.: US 10,837,549 B2
(45) Date of Patent: Nov. 17, 2020

(54) VEHICLE AND METHOD OF CONTROLLING THE SAME

(71) Applicants: Hyundai Motor Company, Seoul (KR); Kia Motors Corporation, Seoul (KR)

(72) Inventor: Hangil Park, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/687,413

(22) Filed: Nov. 18, 2019

(65) Prior Publication Data

US 2020/0309257 A1 Oct. 1, 2020

(30) Foreign Application Priority Data

Apr. 1, 2019 (KR) .................. 10-2019-0037892

(51) Int. Cl.
*F16H 61/02* (2006.01)
*F16H 61/24* (2006.01)
(Continued)

(52) U.S. Cl.
CPC ......... *F16H 61/0204* (2013.01); *F16H 59/10* (2013.01); *F16H 61/24* (2013.01); *F16H 63/50* (2013.01); *F16H 2063/508* (2013.01)

(58) Field of Classification Search
CPC ...... F16H 61/02; F16H 61/0204; F16H 61/24; F16H 59/10; F16H 63/50; F16H 2063/508
See application file for complete search history.

(56) References Cited

U.S. PATENT DOCUMENTS

2005/0126326 A1* 6/2005 Onodera ............. F16H 59/0204
74/473.18
2007/0026994 A1* 2/2007 Matsuda ................. F16H 59/68
477/92
(Continued)

FOREIGN PATENT DOCUMENTS

JP 10-82222 A 3/1998
KR 2003-0001665 A 1/2003
(Continued)

*Primary Examiner* — Huan Le
(74) *Attorney, Agent, or Firm* — Morgan, Lewis & Bockius LLP

(57) ABSTRACT

A vehicle may include a transmission control unit (TCU) to output a control signal to the transmission; a shift lever; a shift lever electronic control unit (ECU) to transmit a first signal and a second signal, to the TCU; a main communication unit to perform communication between the TCU and the shift lever ECU; a backup communication unit to perform communication between the TCU and the shift lever ECU; and a controller configured to: control the shift lever ECU to transmit first and second signals based on one of a plurality of matching codes having different pulse width modulation (PWM) duty ratios assigned to the respective gear positions of the transmission; determine another one of the plurality of matching codes when the operation commands indicated by each of the first signal and the second signal received by the TCU are different; and control the shift lever ECU based on the determined matching code.

20 Claims, 4 Drawing Sheets

(51) Int. Cl.
*F16H 59/10* (2006.01)
*F16H 63/50* (2006.01)

(56) References Cited

U.S. PATENT DOCUMENTS

| | | | |
|---|---|---|---|
| 2010/0085082 A1* | 4/2010 | Katrak | F16H 59/0217 |
| | | | 327/20 |
| 2011/0035121 A1* | 2/2011 | Katrak | F16H 61/68 |
| | | | 701/51 |
| 2017/0149820 A1 | 5/2017 | Ruvio et al. | |

FOREIGN PATENT DOCUMENTS

| | | |
|---|---|---|
| KR | 10-1857554 B1 | 5/2018 |
| KR | 10-2018-0058537 A | 6/2018 |

* cited by examiner

| | FIRST MATCHING CODE | SECOND MATCHING CODE | THIRD MATCHING CODE | FOURTH MATCHING CODE | FIFTH MATCHING CODE |
|---|---|---|---|---|---|
| START SIGNAL | 5% | | | | |
| MATCHING REQUEST SIGNAL | 10% | 15% | 20% | 25% | 30% |
| MATCHING DETERMINATION SIGNAL | 10% (12%) | 15% (17%) | 20% (22%) | 25% (27%) | 30% (32%) |
| P OF GEAR POSITION | 60% | 70% | 80% | 90% | 65% |
| R OF GEAR POSITION | 70% | 80% | 90% | 60% | 75% |
| N OF GEAR POSITION | 80% | 90% | 60% | 70% | 85% |
| D OF GEAR POSITION | 90% | 60% | 70% | 80% | 95% |

VEHICLE AND METHOD OF CONTROLLING THE SAME

CROSS-REFERENCE TO RELATED APPLICATION(S)

The present application claims priority to Korean Patent Application No. 10-2019-0037892, filed on Apr. 1, 2019 in the Korean Intellectual Property Office, the entire contents of which is incorporated herein for all purposes by this reference.

BACKGROUND OF THE INVENTION

Field of the Invention

The present invention relates to a vehicle and a control method thereof for electronically performing shift control.

Description of Related Art

In recent years, an automatic transmission in which a shift is performed by electronic control has been becoming common, unlike a conventional transmission in which a shift is made by driving an actuator in a response to a mechanical operation of a shift lever.

Furthermore, shift-by-wire type shift devices in which the operation of the shift lever and the shifting of the automatic transmission are electronically performed without requiring even the mechanical operation of the shift lever are becoming common.

However, attempts to control a vehicle differently from the intention of a driver by hacking communication between the shift lever and the transmission continuously occur, and techniques for preventing hacking in the shift control have been actively studied.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle for detecting a hack of a communication channel between a shift lever and a transmission and changing a communication protocol between the shift lever and the transmission in accordance with the hacking detection.

In accordance with an aspect of the present invention, a vehicle includes: a transmission; a transmission control unit (TCU) configured to output a control signal to the transmission; a shift lever configured to receive an input for changing a gear position in the transmission; a shift lever electronic control unit (ECU) configured to transmit a first signal and a second signal, each of which indicates an operation command for changing the gear position, to the TCU based on the input; a main communication unit configured to perform communication between the TCU and the shift lever ECU including transmitting and receiving of the first signal; a backup communication unit configured to perform communication between the TCU and the shift lever ECU including transmitting and receiving of the second signal; and a controller configured to: control the shift lever ECU to transmit the first signal and the second signal based on any one of a plurality of matching codes having different pulse width modulation (PWM) duty ratios assigned to the respective gear positions of the transmission; determine another one of the plurality of matching codes when the operation commands indicated by each of the first signal and the second signal received by the TCU are different; and control the shift lever ECU to transmit the first signal and the second signal based on the determined matching code.

The controller may be further configured to: control the TCU and the shift lever ECU to transmit a start signal having a predetermined PWM duty ratio; control the TCU to transmit a matching request signal corresponding to the determined matching code to the shift lever ECU; and control the shift lever ECU to transmit a matching determination signal corresponding to the determined matching code to the TCU.

The matching determination signal may have the same PWM duty ratio as the matching request signal or have a PWM duty ratio which is different from the matching request signal by a predetermined ratio.

The vehicle may further include a user interface configured to receive an input from a user and configured to output at least one of an image and a sound.

The controller may be further configured to: determine another matching code among the plurality of matching codes when an event for changing the matching code occurs; and control the shift lever ECU to transmit the first signal and the second signal based on the determined matching code.

The event for changing the matching code may include at least one of an event for restarting the vehicle after the vehicle is turned off and the controller controls the shift lever ECU to transmit the first signal and the second signal based on the any one of the plurality of matching codes or an event for which a predetermined time has elapsed after the controller controls the shift lever ECU to transmit the first signal and the second signal based on the any one of the plurality of matching codes.

The event for changing the matching code may include an event for receiving an input for the matching code change from a driver through the user interface.

The controller may be further configured to control the user interface to output a message indicating that hacking of the first signal has occurred to at least one of the image and the sound, when the operation commands indicated by each of the first signal and the second signal received by the TCU are different.

The vehicle may further include a communication unit of performing communication with a wide area network, and the controller may be further configured to control the communication unit to transmit a message indicating hacking has occurred to the first signal to at least one of an external server or a terminal of a driver, when the operation commands indicated by each of the first signal and the second signal received by the TCU are different.

The controller may be further configured to control the transmission to engage the gear position with parking (P), or control the vehicle to turn off an engine, when the operation commands indicated by each of the first signal and the second signal received by the TCU are different.

In accordance with another aspect of the present invention, a method of controlling a vehicle that includes a transmission, a transmission control unit (TCU) configured to output a control signal to the transmission, a shift lever configured to receive an input for changing a gear position, a shift lever electronic control unit (ECU), a main communication unit configured to perform communication between the TCU and the shift lever ECU, and a backup communication unit configured to perform communication between the TCU and the shift lever ECU, the method including: controlling the shift lever ECU to transmit a first signal and a second signal respectively indicating an operation command for changing the gear position to the TCU through the main communication unit and the backup communication unit based on any one of a plurality of matching codes having different pulse width modulation (PWM) duty ratios assigned to the respective gear positions of the transmission; determining another one of the plurality of matching codes when the operation commands indicated by each of the first signal and the second signal received by the TCU are different; and controlling the shift lever ECU to transmit the first signal and the second signal based on the determined matching code.

The method may further comprise: controlling the TCU and the shift lever ECU to transmit a start signal having a predetermined PWM duty ratio; controlling the TCU to transmit a matching request signal corresponding to the determined matching code to the shift lever ECU; and controlling the shift lever ECU to transmit a matching determination signal corresponding to the determined matching code to the TCU.

The matching determination signal may have the same PWM duty ratio as the matching request signal or have a PWM duty ratio which is different from the matching request signal by a predetermined ratio.

The vehicle may further include a user interface configured to receive an input from a user and configured to output at least one of an image and a sound.

The method may further comprise: determining another matching code among the plurality of matching codes when an event for changing the matching code occurs; and controlling the shift lever ECU to transmit the first signal and the second signal based on the determined matching code.

The event for changing the matching code may include at least one of an event for restarting the vehicle after the vehicle is turned off and the controller controls the shift lever ECU to transmit the first signal and the second signal based on the any one of the plurality of matching codes or an event for which a predetermined time has elapsed after the controller controls the shift lever ECU to transmit the first signal and the second signal based on the any one of the plurality of matching codes.

The event for changing the matching code may include an event for receiving an input for the matching code change from a driver through the user interface.

The method may further comprise: controlling the user interface to output a message indicating that hacking of the first signal has occurred to at least one of the image and the sound, when the operation commands indicated by each of the first signal and the second signal received by the TCU are different.

The vehicle may further include a communication unit of performing communication with a wide area network, and the method may further comprise: controlling the communication unit to transmit a message indicating hacking has occurred to the first signal to at least one of an external server or a terminal of a driver, when the operation commands indicated by each of the first signal and the second signal received by the TCU are different.

The method may further comprise: controlling the transmission to engage the gear position with parking (P), or control the vehicle to turn off an engine, when the operation commands indicated by each of the first signal and the second signal received by the TCU are different.

According to various aspects of the present invention, it is possible to prevent hacking to the shift control by detecting hacking to the communication channel between the shift lever and the transmission and changing the communication protocol between the shift lever and the transmission in accordance with the hacking detection.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
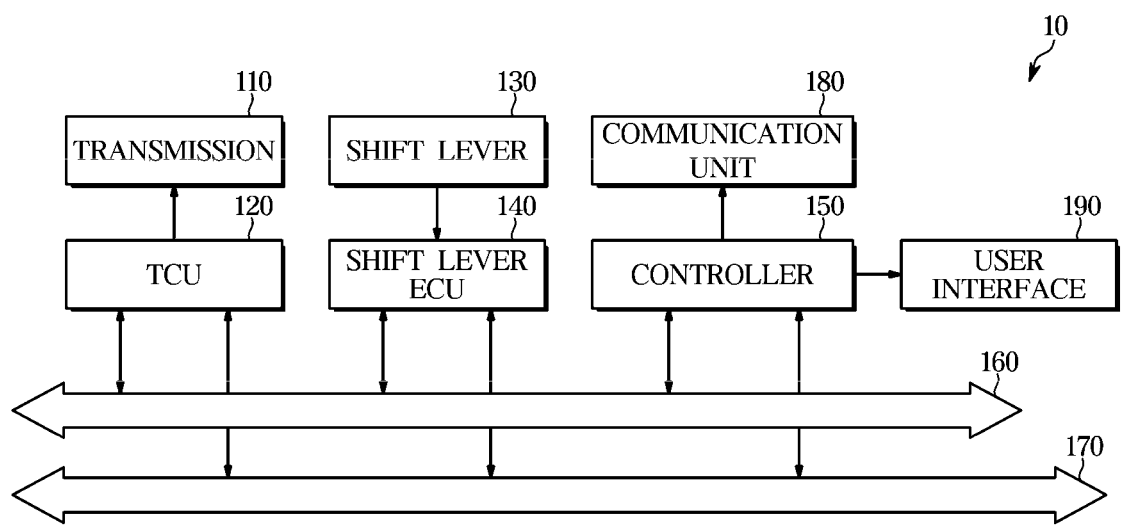
FIG. 1 is a control block diagram of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like numbers refer to like elements throughout the present specification. The present specification does not describe all components of the embodiments, and general information in the technical field to which the present invention belongs or overlapping information between the exemplary embodiments will be omitted.

It will be understood that when a component is referred to as being "connected" to another component, it may be directly or indirectly connected to the other component.

When a component is indirectly connected to another component, it may be connected to the other component through a wireless communication network.

Also, it will be understood that the terms "includes," "comprises," "including," and/or "comprising," when used in the exemplary embodiment, specify the presence of a stated component, but do not preclude the presence or addition of one or more other components.

Also, it is to be understood that the singular forms "a," "an," and "the" include plural referents unless the context clearly dictates otherwise.

As used herein, the terms "portion," "unit," "block," "member," and "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process which is processed by a processor.

Reference numerals used in operations are provided for convenience of description, without describing the order of the operations, and the operations may be executed in an order different from the stated order unless a specific order is definitely specified in the context.

Hereinafter, embodiments of a vehicle according to an aspect and a method of controlling the vehicle will be described in detail with reference to the accompanying drawings.

Figure 2:
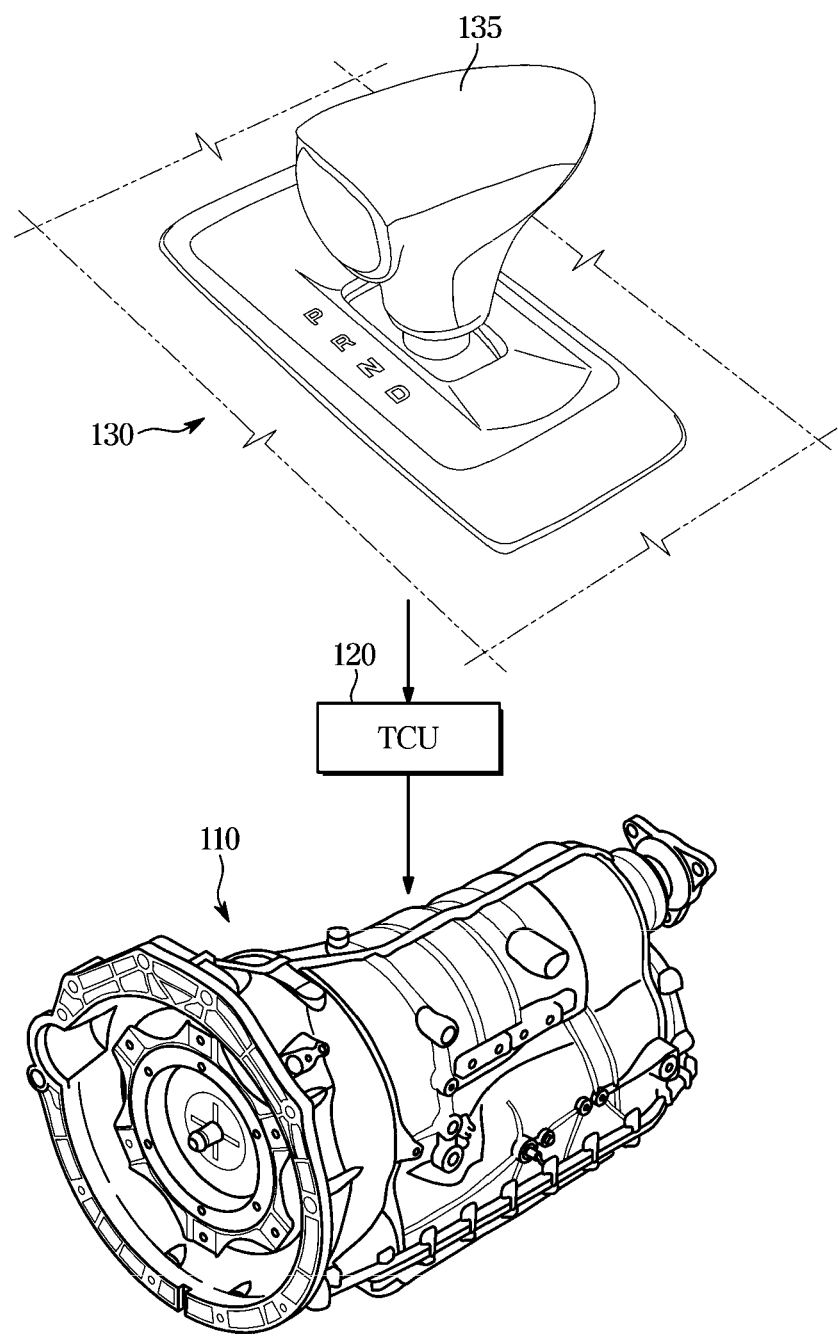
FIG. 2 is a view exemplarily illustrating a transmission system of a vehicle according to an exemplary embodiment of the present invention.
Figures 3, 4:
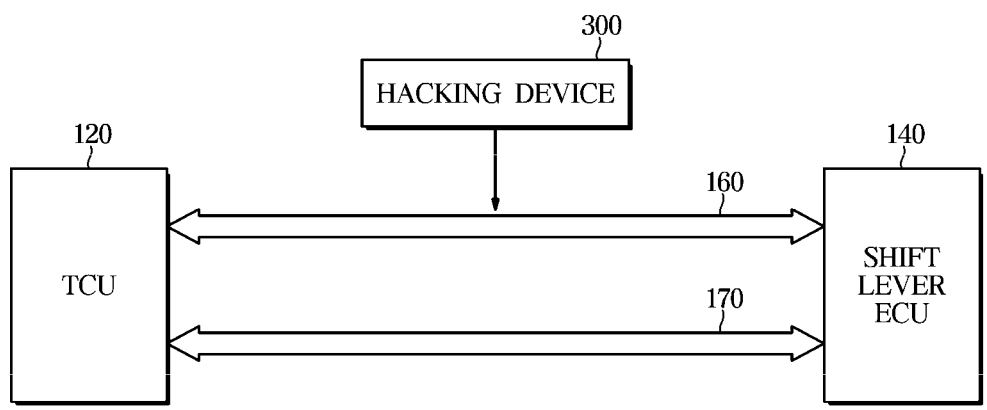
FIG. 3 is a view exemplarily illustrating a case where hacking of shift control occurs through a main communication unit of a vehicle according to an exemplary embodiment of the present invention.
FIG. 4 is a view exemplarily illustrating a plurality of matching codes stored in a vehicle according to an exemplary embodiment of the present invention.

FIG. 1 is a control block diagram of a vehicle according to an exemplary embodiment of the present invention, FIG. 2 is a view exemplarily illustrating a transmission system of a vehicle according to an exemplary embodiment of the present invention, and FIG. 3 is a view exemplarily illustrating a case where hacking of shift control occurs through a main communication unit of a vehicle according to an exemplary embodiment of the present invention.

Referring to FIG. 1, a vehicle 10 according to an exemplary embodiment includes a transmission 110 configured to shift to one of a plurality of gear positions (parking P, reverse R, neutral N, drive D) in accordance with a control signal, a transmission control unit (TCU) 120 for outputting the control signal to the transmission 110, a shift lever 130 for receiving an input for changing the gear position from a driver, a shift lever electronic control unit (ECU) for transmitting an operation command for the change of the gear position to the TCU 120 based on the input to the change of the gear position, a controller 150 for controlling various components included in the vehicle 10 and storing information necessary for the control, a main communication unit 160 and a backup communication unit 170 for performing communication between the TCU 120 and a shift lever ECU 140, a communication unit 180 for communicating with an external electronic device such as an external server, and a user interface 190 for receiving the input from the driver and outputting at least one of an image and a sound.

The transmission 110 according to the exemplary embodiment may perform the shifting by receiving the input for the change of the gear position input through the shift lever 130 via the TCU 120 as shown in FIG. 2.

The TCU 120 according to the exemplary embodiment may receive from the shift lever ECU 140, an electric signal including an electric signal generated upon operation of the shift lever 130, that is, an operation command for changing the gear position. Furthermore, the TCU 120 may output the control signal corresponding to an operation command for the change of the gear position to the transmission 110.

The TCU 120 may include at least one memory storing a program for performing the above-described operations and operations, which will be described below, and at least one processor for executing the stored program. When there is a plurality of memories and processors, they may be integrated into one chip or provided at physically separated positions.

The shift lever 130 according to an exemplary embodiment of the present invention may include a knob 135, as shown in the FIG. 2. At the instant time, the driver may select the gear range corresponding to the parking P, reverse R, neutral N and drive D through a forward operation or a reverse operation of the knob 135, respectively.

However, the shape of the shift lever 130 is not limited to that shown in FIG. 2, and may be a shape realized by use of a physical button, a touch pad, a touch screen, or a stick type operation device.

The shift lever ECU 140 according to an exemplary embodiment of the present invention may generate the electric signal indicating the operation command for changing the gear position based on an input to the shift change of the driver through the shift lever 130. The shift lever ECU 140 may transmit the generated electric signal to the TCU 120 via the main communication unit 160 and the backup communication unit 170.

The shift lever ECU 140 may include at least one memory storing a program for performing the above-described operations and operations, which will be described below, and at least one processor for executing the stored program. When there is a plurality of memories and processors, they may be integrated into one chip or provided at physically separated positions.

As described above, the transmission system of the vehicle 10 performing the shift control may be implemented by a shift by wire (SBW) method. In the transmission system of the SBW system, as described above, the electric signal generated at the time of operation of the shift lever 130 is transmitted to the transmission 110 through the TCU 120 to be shifted. The transmission system of the SBW system is distinguished from an existing transmission system in which shifting is affected by the mechanical movement of the shift lever in that the shifting is conducted by transmitting the control signal through electrical communication.

The controller 150 according to the exemplary embodiment may change the communication protocol between the TCU 120 and the shift lever ECU 140 to block the control of the transmission 110 by an external electrical signal due to hacking, when hacking of the shift control through the main communication unit 160 occurs.

At the present time, the vehicle 10 may include a plurality of communication units for supporting communication between the TCU 120 and the shift lever ECU 140 to determine whether or not the shift control is hacked.

For example, as shown in FIG. 1, the vehicle 10 may be provided with two communication units such as the main communication unit 160 and the backup communication unit 170 separately. The vehicle 10 may include two or more communication units for supporting communication between the TCU 120 and the shift lever ECU 140. Hereinafter, it is assumed that the vehicle 10 includes the main communication unit 160 and the backup communication unit 170.

The controller 150 according to an exemplary embodiment of the present invention may control the shift lever ECU 140 to transmit a first signal and a second signal based on any one of a plurality of matching codes having different pulse width modulation (PWM) duty ratios assigned to the respective gear position from each other.

That is, the controller 150 determines one of the matching codes corresponding to one kind of communication protocol, controls the shift lever ECU 140 to transmit the first signal and the second signal indicating the operation commands for changing the gear position through the main communication unit 160 and the backup communication unit 170, respectively based on the determined matching code.

At the present time, the main communication unit 160 may include a communication module for performing any one of control area network (CAN) communication, CAN FD (flexible date-rate) communication, and Flex-Ray communication. However, the communication type performed by the main communication unit 160 is not limited to the above example, and may be included without limitation as long as it corresponds to the vehicle communication type.

Furthermore, the backup communication unit 170 may include a communication module that performs either PWM communication or SENT (single edge nibble transmission) communication. However, the communication type performed by the backup communication unit 170 is not limited to the above example, and may be included without limitation as long as it corresponds to the vehicle communication type.

In other words, the shift lever ECU 140 may transmit the first signal indicating an operation command for changing the gear position to the TCU 120 via the main communication unit 160 in accordance with the communication type of the main communication unit 160. The shift lever ECU 140 may also transmit the second signal indicating an operation command for changing the gear position to the TCU 120 via the backup communication unit 170 in accordance with the communication type of the backup communication unit 170.

At the present time, as shown in FIG. 3, the controller 150 may transmit the first signal through a hacking apparatus 300 connected to the main communication unit 160, when the first signal received by the TCU 120 and the second signal received by the TCU 120 are different from each other.

That is, the hacking apparatus 300 may access the main communication unit 160 through wired/wireless communication, and can determine a matching code corresponding to the first signal transmitted/received through the main communication unit 160. Thereafter, the hacking apparatus 300 may attempt to hack the shift control by transmitting the first signal to the TCU 120 as if it was transmitted from the shift lever ECU 140, based on the determined matching code.

In the present manner, the controller 150 may allow the first signal transmitted from the hacking apparatus 300 to be excluded on the TCU 120 by changing the matching code, when the operation commands of the first signal and the second signal received by the TCU 120 according to the operation of the hacking apparatus 300 outside the vehicle 10 are different.

Furthermore, the controller 150 according to the exemplary embodiment may change the communication protocol between the TCU 120 and the shift lever ECU 140 even when an event for changing the communication protocol occurs. The configuration for changing the communication protocol between the TCU 120 and the shift lever ECU 140 will be described later in detail.

The controller 150 may include at least one memory storing a program for performing the above-described operations and operations, which will be described below, and at least one processor for executing the stored program. When there is a plurality of memories and processors, they may be integrated into one chip or provided at physically separated positions. It is also possible that the processor and the memory of the controller 150 are integrated with at least one of the TCU 120 and the shift lever ECU 140 and the memory in one chip.

The communication unit 180 according to an exemplary embodiment of the present invention may perform communication with an external electronic device such as an external server or the driver's portable terminal device. To the present end, the communication unit 180 may be connected to the wide area communication network through wireless communication, and the wireless communication may include cellular communication using, for example, at least one of 5th generation (5G), Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile communications (GSM), or the like. The wireless communication may include, for example, at least one of wireless fidelity (WiFi), Bluetooth, Bluetooth low power (BLE), Zigbee, Near Field Communication (NFC), Magnetic Secure Transmission, Radio Frequency (RF), or Body Area Network (BAN). The wireless communication may include GNSS. The GNSS may refer to, for example, a Global Positioning System (GPS), a Global Navigation Satellite System (GLONASS), a BeiDou Navigation Satellite System (hereinafter, referred to as "BeiDou"), and Galileo, an European global satellite-based navigation system.

The user interface 190 according to an exemplary embodiment of the present invention may receive an input from the driver and may output at least one of an image and a sound.

To the present end, the user interface 190 may include an input device provided in a center fascia mounted at the center portion of a dashboard. The input device may be a physical button, a knob, a touch pad, a touch screen, a stick type operation device, or a track ball.

Furthermore, the user interface 190 may include a speaker provided inside the vehicle 10 to output a sound, and may include a display panel provided inside the vehicle 10 to output an image. The panel may be at least one of a cathode ray tube (CRT) panel, a liquid crystal display (LCD) panel, a light emitting diode (LED) panel, an organic light emitting diode (OLED) panel, a plasma display panel (PDP), and a field emission display (FED) panel.

The control block diagram of the vehicle 10 has been described above. The configuration in which the vehicle 10 changes the matching code corresponding to the communication protocol between the TCU 120 and the shift lever ECU 140 of the vehicle 10 will be described in detail.

FIG. 4 is a view exemplarily illustrating a plurality of matching codes stored in the vehicle 10 according to an exemplary embodiment of the present invention.

Referring to FIG. 4, the memory included in the vehicle 10 may store a matching code corresponding to the communication protocol between the TCU 120 and the shift lever ECU 140.

At the present time, the memory may store a plurality of matching codes in which information on the PWM duty ratio allocated to each gear stage is different from each other.

That is, as shown in FIG. 4, the plurality of matching codes may have different information on PWM duty ratios assigned to the respective gear positions (parking P, reverse R, neutral N, and drive D).

For example, the first matching code assigns the PWM duty ratio of 60% to the parking P of the gear position, the second matching code assigns the PWM duty ratio of 70% to the parking P of the gear position, the third matching code assigns the PWM duty ratio of 80% to the parking P or the gear position, and the PWM duty ratios allocated to the parking P of the gear position in each of the matching codes may be different from each other.

The TCU 120 and the shift lever ECU 140 may transmit and receive the first signal and the second signal indicating the operation command for changing the gear position, based on any one of the plurality of matching codes.

Each of the TCU 120 and the shift lever ECU 140 must identify which one of the matching codes is to transmit and receive signals based on any one of the matching codes.

To the present end, the controller 150 may control the TCU 120 and the shift lever ECU 140 to transmit a start signal (for example, a percentage (5%)) having a preset PWM duty ratio. The TCU 120 and the shift lever ECU 140 may initiate a procedure for setting or changing the matching code when receiving the start signal received from a counterpart, respectively.

Thereafter, the controller 150 may determine any one of the matching codes for communication between the TCU 120 and the shift lever ECU 140, may control the TCU 120 to transmit the matching request signal corresponding to the determined matching code to the shift lever ECU 140, and may control the shift lever ECU 140 to transmit a matching determination signal corresponding to the determined matching code to the TCU 120.

At the present time, the plurality of matching codes may have different information on the PWM duty ratio allocated to the matching request signal and the matching determination signal.

For example, the first matching code assigns the PWM duty ratio of 10% to the matching request signal, the second matching code assigns the PWM duty ratio of 15% to the matching request signal, the third matching code assigns the PWM duty ratio of 20% to the matching request signal, and the PWM duty ratios allocated to the matching request signal in each of the matching codes may be different from each other.

At the present time, each of the matching codes may be assigned the same PWM duty ratio as the matching request signal in each of the matching codes to the matching determination signal, or may be assigned the PWM duty ratio having a difference (for example, 2%) as a predetermined ratio from the matching request signal in each of the matching codes.

The shift lever ECU 140 may identify that the matching code corresponding to the matching request signal received from the TCU 120 is the matching code determined for communication, and may transmit to the TCU 120 the matching determination signal corresponding to the determined matching code. The TCU 120 may also identify that the matching determination signal received from the shift lever ECU 140 corresponds to the matching code determined for communication.

Accordingly, the TCU 120 and the shift lever ECU 140 may perform communication based on the matching code determined by a mutual communication protocol by identifying the determined matching code.

At the present time, the start signal, the matching request signal, and the matching determination signal may be transmitted and received by at least one of the main communication unit 160 and the backup communication unit 170, respectively.

As described above, if there is a hack of one of the matching codes, the signal due to the hacking may be excluded by changing to another matching code based on the information on the PWM duty ratio allocated to each of the gear positions of the matching code which is different from each other.

The controller 150 may control the shift lever ECU 140 to transmit the first signal and the second signal based on any one of the plurality of matching codes, may determine another one of the plurality of matching codes when the operation commands indicated by each of the first signal and the second signal received by the TCU 120 are different, and may control the shift lever ECU 140 to transmit the first signal and the second signal based on the determined another one of the matching codes.

To the present end, the controller 150 may control the TCU 120 and the shift lever ECU 140 to transmit a start signal having a predetermined PWM duty ratio, and may control the TCU 120 to transmit a matching request signal corresponding to the determined matching code to the shift lever ECU 140, and may control the shift lever ECU 140 to transmit a matching determination signal corresponding to the determined matching code to the TCU 120.

Accordingly, the TCU 120 and the shift lever ECU 140 may perform communication based on another matching code determined by the mutual communication protocol by identifying the other matching code.

That is, the controller 150 may allow the first signal transmitted from the hacking apparatus 300 to be excluded on the TCU 120 by changing the matching code, when the operation commands of each of the first signal and the second signal received by the TCU 120 according to the operation of the hacking apparatus 300 outside the vehicle 10 are different.

Furthermore, the controller 150 may control the user interface 190 to output a message indicating that hacking of the first signal has occurred to at least one of an image and a sound, when the operation commands indicated by each of the first signal and the second signal received by the TCU 120 are different.

Furthermore, the controller 150 may control the communication unit 180 to transmit a message indicating hacking has occurred to the first signal to at least one of an external server or a terminal of the driver, when the operation commands indicated by each of the first signal and the second signal received by the TCU 120 are different.

At the present time, the external server may correspond to a server of a private security company which is responsible for the liability of the vehicle 10, and may correspond to a server for filing a report by the police. That is, the vehicle 10 reports hacking of the vehicle 10 to the external server, facilitating quick response to hacking.

Furthermore, the controller 150 may control the transmission to engage the gear position with parking (P), or control the vehicle 10 to turn off the engine, when the operation commands indicated by each of the first signal and the second signal received by the TCU are different.

Furthermore, the controller 150 may determine another matching code among the plurality of matching codes when an event for changing the matching code occurs, and may control the shift lever ECU 140 to transmit the first signal and the second signal based on the determined another matching code.

In other words, the controller 150 may change the matching code from time to time based on the occurrence of an event for changing the matching code, alleviating the risk of hacking which may occur when communication to a single matching code is continued.

At the present time, the event for changing the matching code includes at least one of an event for restarting the vehicle 10 after the vehicle 10 is turned off and the controller 150 controls the shift lever ECU 140 to transmit the first signal and the second signal based on the any one of the plurality of matching codes or an event for which a predetermined time has elapsed after the controller 150 controls the shift lever ECU 140 to transmit the first signal and the second signal based on the any one of the plurality of matching codes.

Furthermore, the event for changing the matching code includes an event for receiving an input for the matching code change from the driver through the user interface 190.

Hereinafter, a control method of the vehicle 10 will be described. The vehicle 10 according to the above-described embodiment may be applied to the control method of the vehicle 10, as will be described later. Therefore, description provided above with reference to FIG. 1, FIG. 2, FIG. 3, and FIG. 4 may be applied to the control method of the vehicle 10 in the same manner, unless otherwise noted.

Figure 5:
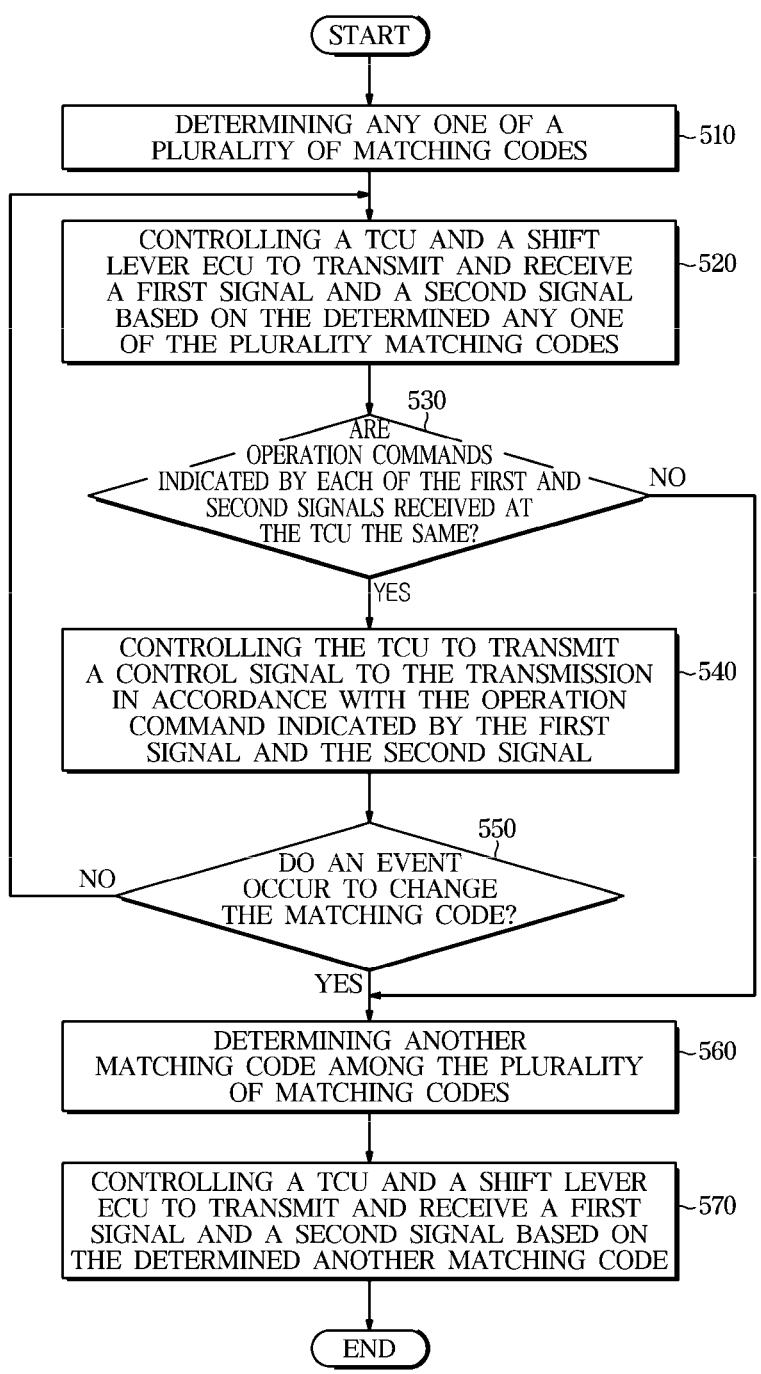
FIG. 5 is a flowchart related to a case where a matching code is changed in a method of controlling a vehicle according to an exemplary embodiment of the present invention.

FIG. 5 is a flowchart related to a case where a matching code is changed in a method of controlling the vehicle 10 according to an exemplary embodiment of the present invention.

Referring to FIG. 5, the controller 150 may determine any one of the plurality of matching codes (510), may control the TCU 120 and the shift lever ECU 140 to transmit and receive the first signal and the second signal based on the determined any one of the plurality of matching codes (520).

When the first and second signals received by the TCU 120 are identical in operation command (Yes in 530), the controller 150 may control the TCU 120 to transmit a control signal to the transmission 110 according to the operation command indicated by the first signal and the second signal (540).

When the operation commands indicated by each of the first signal and the second signal received by the TCU 120 are different (No in 530), the controller 150 may determine another one of the plurality of matching codes (560), and may control the TCU 120 and the shift lever ECU 140 to transmit and receive the first signal and the second signal based on the determined another one matching code (570).

To the present end, the controller 150 may control the TCU 120 and the shift lever ECU 140 to transmit a start signal having a predetermined PWM duty ratio, and may control the TCU 120 to transmit a matching request signal corresponding to the determined matching code to the shift lever ECU 140, and may control the shift lever ECU 140 to transmit a matching determination signal corresponding to the determined matching code to the TCU 120.

Accordingly, the TCU 120 and the shift lever ECU 140 may perform communication based on another matching code determined by the mutual communication protocol by identifying the other matching code determined.

That is, the controller 150 may allow the first signal transmitted from the hacking apparatus 300 to be excluded on the TCU 120 by changing the matching code, when the operation commands of each of the first signal and the second signal received by the TCU 120 according to the operation of the hacking apparatus 300 outside the vehicle 10 are different.

Furthermore, when an event for changing the matching code occurs (Yes in 550), the controller 150 may determine another matching code among the plurality of matching codes (560), and may control the TCU 120 and the shift lever ECU 140 to transmit and receive the first signal and the second signal based on the determined another matching code (570).

In other words, the controller 150 may change the matching code from time to time based on the occurrence of an event for changing the matching code, alleviating the risk of hacking which may occur when communication to a single matching code is continued.

At the present time, the event for changing the matching code includes at least one of an event for restarting the vehicle 10 after the vehicle 10 is turned off and the controller 150 controls the shift lever ECU 140 to transmit the first signal and the second signal based on the any one of the plurality of matching codes or an event for which a predetermined time has elapsed after the controller 150 controls the shift lever ECU 140 to transmit the first signal and the second signal based on the any one of the plurality of matching codes.

Furthermore, the event for changing the matching code includes an event for receiving an input for the matching code change from the driver through the user interface 190.

Meanwhile, the disclosed exemplary embodiments may be implemented in a form of a recording medium storing instructions that are executable by a computer. The instructions may be stored in a form of a program code, and when executed by a processor, the instructions may generate a program module to perform operations of the included exemplary embodiments. The recording medium may be implemented as a computer-readable recording medium.

The computer-readable recording medium may include all kinds of recording media storing commands which may be interpreted by a computer. For example, the computer-readable recording medium may be ROM, RAM, a magnetic tape, a magnetic disc, flash memory, an optical data storage device, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
a transmission;
a transmission control unit (TCU) configured to output a control signal to the transmission;
a shift lever configured to receive an input for changing a gear position in the transmission;

a shift lever electronic control unit (ECU) configured to transmit a first signal and a second signal to the TCU based on the input, wherein the first and second signals indicate operation commands for changing the gear position;

a main communication unit configured to perform a first communication between the TCU and the shift lever ECU, the first communication including transmitting and receiving of the first signal;

a backup communication unit configured to perform a second communication between the TCU and the shift lever ECU, the second communication including transmitting and receiving of the second signal; and a controller configured to:
control the shift lever ECU to transmit the first signal and the second signal based on one of a plurality of matching codes having different pulse width modulation (PWM) duty ratios assigned to respective gear positions of the transmission;

determine another of the plurality of matching codes when the operation commands indicated by each of the first signal and the second signal received by the TCU are different; and control the shift lever ECU to transmit the first signal and the second signal based on the determined matching code.

2. The vehicle according to claim 1, wherein the controller is further configured to:
control the TCU and the shift lever ECU to transmit a start signal having a predetermined PWM duty ratio;
control the TCU to transmit a matching request signal corresponding to the determined matching code to the shift lever ECU; and
control the shift lever ECU to transmit a matching determination signal corresponding to the determined matching code to the TCU.

3. The vehicle according to claim 2, wherein the matching determination signal has a same PWM duty ratio as the matching request signal or has a PWM duty ratio which is different from the matching request signal by a predetermined ratio.

4. The vehicle according to claim 1, wherein the vehicle further includes a user interface configured to receive an input from a user and configured to output at least one of an image and a sound.

5. The vehicle according to claim 4, wherein the controller is further configured to:
determine another matching code among the plurality of matching codes when an event for changing the matching code occurs; and
control the shift lever ECU to transmit the first signal and the second signal based on the determined matching code.

6. The vehicle according to claim 5, wherein the event for changing the matching code includes at least one of an event for restarting the vehicle after the vehicle is turned off and the controller controls the shift lever ECU to transmit the first signal and the second signal based on the one of the plurality of matching codes or an event for which a predetermined time has elapsed after the controller controls the shift lever ECU to transmit the first signal and the second signal based on the one of the plurality of matching codes.

7. The vehicle according to claim 5, wherein the event for changing the matching code includes an event for receiving an input for the matching code change from a driver through the user interface.

8. The vehicle according to claim 4, wherein the controller is further configured to control the user interface to output a message indicating that hacking of the first signal has occurred to at least one of the image and the sound, when the operation commands indicated by each of the first signal and the second signal received by the TCU are different.

9. The vehicle according to claim 1,
wherein the vehicle further includes a communication unit configured to perform communication with a wide area network, and
wherein the controller is further configured to control the communication unit to transmit a message indicating hacking has occurred to the first signal to at least one of an external server or a terminal of a driver, when the operation commands indicated by each of the first signal and the second signal received by the TCU are different.

10. The vehicle according to claim 1, wherein the controller is further configured to control the transmission to engage the gear position with parking (P), or control the vehicle to turn off an engine, when the operation commands indicated by each of the first signal and the second signal received by the TCU are different.

11. A method of controlling a vehicle that includes a transmission, a transmission control unit (TCU) configured to output a control signal to the transmission, a shift lever configured to receive an input for changing a gear position, a shift lever electronic control unit (ECU), a main communication unit configured to perform communication between the TCU and the shift lever ECU, and a backup communication unit configured to perform communication between the TCU and the shift lever ECU, the method including:
controlling the shift lever ECU to transmit a first signal and a second signal indicating operation commands for changing the gear position to the TCU through the main communication unit and the backup communication unit based on one of a plurality of matching codes having different pulse width modulation (PWM) duty ratios assigned to respective gear positions of the transmission;

determining another of the plurality of matching codes when the operation commands indicated by each of the first signal and the second signal received by the TCU are different; and controlling the shift lever ECU to transmit the first signal and the second signal based on the determined matching code.

12. The method according to claim 11, further including:
controlling the TCU and the shift lever ECU to transmit a start signal having a predetermined PWM duty ratio;
controlling the TCU to transmit a matching request signal corresponding to the determined matching code to the shift lever ECU; and
controlling the shift lever ECU to transmit a matching determination signal corresponding to the determined matching code to the TCU.

13. The method according to claim 12, wherein the matching determination signal has a same PWM duty ratio as the matching request signal or has a PWM duty ratio which is different from the matching request signal by a predetermined ratio.

14. The method according to claim 11, wherein the vehicle further includes a user interface configured to receive an input from a user and configured to output at least one of an image and a sound.

15. The method according to claim 14, further including:
- determining another matching code among the plurality of matching codes when an event for changing the matching code occurs; and
- controlling the shift lever ECU to transmit the first signal and the second signal based on the determined matching code.

16. The method according to claim 15,
- wherein the event for changing the matching code includes at least one of an event for restarting the vehicle after the vehicle is turned off and the controller controls the shift lever ECU to transmit the first signal and the second signal based on the one of the plurality of matching codes or an event for which a predetermined time has elapsed after the controller controls the shift lever ECU to transmit the first signal and the second signal based on the one of the plurality of matching codes.

17. The method according to claim 15, wherein the event for changing the matching code includes an event for receiving an input for the matching code change from a driver through the user interface.

18. The method according to claim 14, further including:
- controlling the user interface to output a message indicating that hacking of the first signal has occurred to at least one of the image and the sound, when the operation commands indicated by each of the first signal and the second signal received by the TCU are different.

19. The method according to claim 11,
- wherein the vehicle further includes a communication unit configured to perform communication with a wide area network, and
- wherein the method further includes controlling the communication unit to transmit a message indicating hacking has occurred to the first signal to at least one of an external server or a terminal of a driver, when the operation commands indicated by each of the first signal and the second signal received by the TCU are different.

20. The method according to claim 11, further including:
- controlling the transmission to engage the gear position with parking (P), or control the vehicle to turn off an engine, when the operation commands indicated by each of the first signal and the second signal received by the TCU are different.

\* \* \* \* \*